US007853531B2

(12) United States Patent
Lao et al.

(10) Patent No.: US 7,853,531 B2
(45) Date of Patent: Dec. 14, 2010

(54) METHOD AND APPARATUS FOR SUPPORTING MULTIPLE TRUST ZONES IN A DIGITAL RIGHTS MANAGEMENT SYSTEM

(75) Inventors: Guillermo Lao, Torrance, CA (US); Xin Wang, Torrance, CA (US); Thanh Ta, Huntington Beach, CA (US); Joseph Zhung Yee Fung, Cerritos, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 2008 days.

(21) Appl. No.: 10/162,210

(22) Filed: Jun. 5, 2002

(65) Prior Publication Data
US 2002/0198845 A1 Dec. 26, 2002

Related U.S. Application Data

(60) Provisional application No. 60/296,115, filed on Jun. 7, 2001.

(51) Int. Cl.
G06F 21/00 (2006.01)
(52) U.S. Cl. .............................. 705/59; 705/50; 705/75
(58) Field of Classification Search .................. 705/51, 705/59
See application file for complete search history.

(56) References Cited

U.S. PATENT DOCUMENTS

| 3,263,158 | A | 7/1966 | Janis |
|---|---|---|---|
| 3,609,697 | A | 9/1971 | Blevins et al. |
| 3,790,700 | A | 2/1974 | Callais et al. |
| 3,798,605 | A | 3/1974 | Feistel |
| 4,159,468 | A | 6/1979 | Barnes et al. |
| 4,200,700 | A | 4/1980 | Mäder |

(Continued)

FOREIGN PATENT DOCUMENTS

BR 9810967 A 10/2001

(Continued)

OTHER PUBLICATIONS

Delaigle, "Digital Watermarking," Spie Conference in Optical Security and Counterfeit Deterrence Techniques, San Jose, CA (Feb. 1996).

(Continued)

Primary Examiner—Charles C Agwumezie
(74) Attorney, Agent, or Firm—Reed Smith LLP; Marc S. Kaufman; Stephen M. Hertzler (57) ABSTRACT

Digital rights management method and system for items having usage rights. A first activation device defines a first trust zone. A first license device associated with the first trust zone generates an open license having usage rights associated with a first item. A second activation device defines a second trust zone and is adapted to issue a software package that enforces usage rights. A user device associated with the second trust zone is adapted to receive the software package from the second activation device, to receive the open license associated with the first item, and to use the first item in accordance with the open license. In addition, a method is provided for enforcing a license granting usage rights associated with a protected item, and for classifying a license, the license being an open license or a closed license.

39 Claims, 6 Drawing Sheets

U.S. PATENT DOCUMENTS

| | | | |
|---|---|---|---|
| 4,220,991 A | 9/1980 | Hamano et al. | |
| 4,278,837 A | 7/1981 | Best | |
| 4,323,921 A | 4/1982 | Guillou | |
| 4,361,851 A | 11/1982 | Asip et al. | |
| 4,423,287 A | 12/1983 | Zeidler | |
| 4,429,385 A | 1/1984 | Cichelli et al. | |
| 4,442,486 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,621,321 A | 11/1986 | Boebert et al. | |
| 4,644,493 A | 2/1987 | Chandra et al. | |
| 4,658,093 A | 4/1987 | Hellman | |
| 4,713,753 A | 12/1987 | Boebert et al. | |
| 4,736,422 A | 4/1988 | Mason | |
| 4,740,890 A | 4/1988 | William | |
| 4,796,220 A | 1/1989 | Wolfe | |
| 4,816,655 A | 3/1989 | Musyck et al. | |
| 4,817,140 A | 3/1989 | Chandra et al. | |
| 4,827,508 A | 5/1989 | Shear | |
| 4,868,376 A | 9/1989 | Lessin et al. | |
| 4,888,638 A | 12/1989 | Bohn | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,129,083 A | 7/1992 | Cutler et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,174,641 A | 12/1992 | Lim | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,287,408 A | 2/1994 | Samson | |
| 5,291,596 A | 3/1994 | Mita | |
| 5,293,422 A | 3/1994 | Loiacono | |
| 5,301,231 A | 4/1994 | Abraham et al. | |
| 5,311,591 A | 5/1994 | Fischer | |
| 5,319,705 A | 6/1994 | Halter et al. | |
| 5,335,275 A | 8/1994 | Millar et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,386,369 A | 1/1995 | Christiano | |
| 5,390,297 A | 2/1995 | Barber et al. | |
| 5,394,469 A | 2/1995 | Nagel et al. | |
| 5,410,598 A | 4/1995 | Shear | |
| 5,412,717 A | 5/1995 | Fischer | |
| 5,414,852 A | 5/1995 | Kramer et al. | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,485,577 A | 1/1996 | Eyer et al. | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,816 A | 4/1996 | Hamilton et al. | |
| 5,504,818 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,535,276 A | 7/1996 | Ganesan | |
| 5,539,735 A | 7/1996 | Moskowitz | |
| 5,553,143 A | 9/1996 | Ross et al. | |
| 5,557,678 A | 9/1996 | Ganesan | |
| 5,563,946 A | 10/1996 | Cooper et al. | |
| 5,564,038 A | 10/1996 | Grantz et al. | |
| 5,568,552 A | 10/1996 | Davis | |
| 5,619,570 A | 4/1997 | Tsutsui | |
| 5,621,797 A | 4/1997 | Rosen | |
| 5,625,690 A | 4/1997 | Michel et al. | |
| 5,629,980 A | 5/1997 | Stefik et al. | |
| 5,633,932 A | 5/1997 | Davis et al. | |
| 5,634,012 A | 5/1997 | Stefik et al. | |
| 5,636,346 A | 6/1997 | Saxe | |
| 5,638,443 A | 6/1997 | Stefik et al. | |
| 5,638,513 A | 6/1997 | Ananda | |
| 5,649,013 A | 7/1997 | Stuckey et al. | |
| 5,655,077 A | 8/1997 | Jones et al. | |
| 5,708,709 A | 1/1998 | Rose | |
| 5,708,717 A | 1/1998 | Alasia | |
| 5,715,403 A | 2/1998 | Stefik | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,745,879 A | 4/1998 | Wyman | |
| 5,748,783 A | 5/1998 | Rhoads | |
| 5,757,907 A | 5/1998 | Cooper et al. | |
| 5,761,686 A | 6/1998 | Bloomberg | |
| 5,764,807 A | 6/1998 | Pearlman et al. | |
| 5,765,152 A | 6/1998 | Erickson | |
| 5,768,426 A | 6/1998 | Rhoads | |
| 5,787,172 A | 7/1998 | Arnold | |
| 5,790,677 A | 8/1998 | Fox et al. | |
| 5,812,664 A | 9/1998 | Bernobich et al. | |
| 5,825,876 A | 10/1998 | Peterson | |
| 5,825,879 A | 10/1998 | Davis | |
| 5,825,892 A | 10/1998 | Braudaway et al. | |
| 5,838,792 A | 11/1998 | Ganesan | |
| 5,848,154 A | 12/1998 | Nishio et al. | |
| 5,848,378 A | 12/1998 | Shelton et al. | |
| 5,850,433 A | 12/1998 | Rondeau | |
| 5,892,900 A | 4/1999 | Ginter et al. | |
| 5,910,987 A | 6/1999 | Ginter et al. | |

| | | | |
|---|---|---|---|
| 5,915,019 A | 6/1999 | Ginter et al. | |
| 5,917,912 A | 6/1999 | Ginter et al. | |
| 5,920,861 A | 7/1999 | Hall et al. | |
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,987,134 A | 11/1999 | Shin et al. | |
| 5,991,876 A | 11/1999 | Johnson et al. | |
| 5,999,624 A | 12/1999 | Hopkins | |
| 5,999,949 A | 12/1999 | Crandall | |
| 6,006,332 A | 12/1999 | Rabne et al. | |
| 6,020,882 A | 2/2000 | Kinghorn et al. | |
| 6,047,067 A | 4/2000 | Rosen | |
| 6,073,234 A | 6/2000 | Kigo et al. | |
| 6,091,777 A | 7/2000 | Guetz et al. | |
| 6,112,181 A | 8/2000 | Shear et al. | |
| 6,112,239 A | 8/2000 | Kenner et al. | |
| 6,115,471 A | 9/2000 | Oki et al. | |
| 6,135,646 A | 10/2000 | Kahn et al. | |
| 6,138,119 A | 10/2000 | Hall et al. | |
| 6,141,754 A | 10/2000 | Choy | |
| 6,157,719 A | 12/2000 | Wasilewski et al. | |
| 6,157,721 A | 12/2000 | Shear et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,226,618 B1 | 5/2001 | Downs et al. | |
| 6,233,684 B1 | 5/2001 | Stefik et al. | |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,307,939 B1 | 10/2001 | Vigarie | |
| 6,327,652 B1 | 12/2001 | England et al. | |
| 6,330,670 B1 | 12/2001 | England et al. | |
| 6,345,256 B1 | 2/2002 | Milsted et al. | |
| 6,353,888 B1 | 3/2002 | Kakehi et al. | |
| 6,363,488 B1 | 3/2002 | Ginter et al. | |
| 6,389,402 B1 | 5/2002 | Ginter et al. | |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,796,555 B1 | 9/2004 | Blahut | |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0037467 A1 | 11/2001 | O'Toole, Jr. et al. | |
| 2001/0039659 A1 | 11/2001 | Simmons et al. | |
| 2002/0001387 A1 | 1/2002 | Dillon | |
| 2002/0035618 A1 | 3/2002 | Mendez et al. | |
| 2002/0044658 A1 | 4/2002 | Wasilewski et al. | |
| 2002/0056118 A1 | 5/2002 | Hunter et al. | |
| 2002/0069282 A1 | 6/2002 | Reisman | |
| 2002/0099948 A1 | 7/2002 | Kocher et al. | |
| 2002/0127423 A1 | 9/2002 | Kayanakis | |
| 2003/0097567 A1 | 5/2003 | Terao et al. | |
| 2003/0105721 A1* | 6/2003 | Ginter et al. ............ 705/54 |
| 2004/0052370 A1 | 3/2004 | Katznelson | |
| 2004/0172552 A1 | 9/2004 | Boyles et al. | |
| 2007/0101123 A1* | 5/2007 | Kollmyer et al. ............ 713/154 |
| 2007/0204146 A1* | 8/2007 | Pedlow et al. ............ 713/153 |
| 2007/0206682 A1* | 9/2007 | Hamilton et al. ....... 375/240.25 |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 715 246 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 0 999 488 A2 | 5/2000 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |

| | | |
|---|---|---|
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/09703 A 1 | 2/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Perritt, "Technologies Strategies for Protecting Intellectual Property in the Networked Multimedia Environment," Knowbots, Permissions Headers and Contract Law (Apr. 2-3, 1993).
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" DRAFT (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Lannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9 , 1997, 1997 Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-89, 549-55, 560-64, 572-75, 599-613, 616-31 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
Ah Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
Ius Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wildpedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).
Corporation for National Research Initiatives, "Digital Object Architecture Project", http://www.nnri.reston.va.us/doa.html(updated Nov. 28, 2006).
Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).

PCT International Search Report dated Apr. 4, 2003 (PCT/US02/17610).

Johnson et al., "A Secure Distributed Capability Based System," Proceedings of the 1985 ACM Annual Conference on The Range of Computing: Mid-80's Perspective: Mid-80'S Perspective *Association for Computing Machinery* pp. 392-402 (1985).

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990, The Transactions of the IEICE, vol. E 73, No. 7, Tokyo, JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network ", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

Perritt, "Technologies Strategies for Protecting IP in the Networked Multimedia Environment", Apr. 2-3, 1993, Knowbot Permissions.

Delaigle, "Digital Watermarking", Spie Conference in Optical Security and Counterfeit Deterrence Techniques, San Jose, CA Feb. 1996, vol. 2659 pp. 99-110.

European Search Report dated Jun. 11, 2004 (European Patent Application No. 02 734 667.5).

\* cited by examiner

METHOD AND APPARATUS FOR SUPPORTING MULTIPLE TRUST ZONES IN A DIGITAL RIGHTS MANAGEMENT SYSTEM

RELATED APPLICATION DATA

This application claims benefit from U.S. provisional application Ser. No. 60/296,115 filed on Jun. 7, 2001, the disclosure of which is incorporated herein by reference.

BACKGROUND OF THE INVENTION

1. Field of the Invention

The present invention is directed to systems for controlling the distribution of items, such as digital content. In particular, the present invention is directed to such systems that support multiple trust zones.

2. Description of Related Art

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference, disclose DRM Systems addressing these issues.

In the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works with high quality. Accordingly, mechanisms of protecting digital works are necessary to retain rights of the owner of the work.

Unfortunately, it has been widely recognized that it is difficult to prevent, or even deter, people from making unauthorized copies of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies and the development of what is presently known as the "National Information Infrastructure" (NII) will render it even more convenient to distribute large documents electronically, including video files such as full length motion pictures, and thus will remove any remaining deterrents to unauthorized copying and distribution of digital works. Accordingly, DRM technologies are becoming a high priority.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as CRYPTOLOPES™ and DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications, such as browsers, are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use such as, viewing only, use once, distribution, and the like. Usage rights can be contingent on payment or other conditions.

Conventional implementations of DRM Systems work well in a single activation server system, where the activation server provides one or more clients with a public and private key pair, or other identification mechanism, during activation to allow the client to access and use the protected content based on provisions specified by a license issued by one or more license servers. The single activation by a single activation server system allows the same activation to be used to enforce usage rights for all the content protected with the DRM System. By allowing the activated client to discern cryptographic signatures, signatures by license servers that have not been activated by the same activation system will be rejected which means that there will be interoperability problems if more than one activation system is provided in the DRM System. However, the multiplicity of parties to electronic transactions and various business models in use today often results in multiple activation systems and the resulting multiplicity of activations for content from various systems. Such multiple activations complicate the user experience because different sets of keys, or other identification mechanism, are required to use different content.

SUMMARY OF THE INVENTION

A first aspect of the invention is a rights management system for managing use of items having usage rights associated therewith. The system comprises a first activation device defining a trust zone and adapted to issue a first software package that enforces usage rights, a second activation device defining a second trust zone and adapted to issue a second software package that enforces usage rights, and at least one first license device associated with said first trust zone. The first license generates a license associated with the items and including usage rights specifying a manner of use. The license also specifies one or more trust zones in which the license is valid. At least one user device is associated with the first trust zone and receives the first software package and the license to use the items in accordance with the license.

A second aspect of the invention is a rights management system for managing use of items having usage rights associated therewith. The system comprises a plurality of activation devices, defining trust zones and being adapted to issue a software package that enforces usage rights to control use of the items, at lease one license device associated with each of the trust zones, the license devices being adapted to generate a license associated with the items and having usage rights specifying a manner of use. The license also includes a designation as one of an open and closed license. A plurality of usage devices are associated with one of the trust zones and receive the software package and the license to use the items in accordance with said license.

A third aspect of the invention is a rights management system for managing use of items having usage rights associated therewith. The system comprises a first activation device defining a first trust zone, a first license device associated with the first trust zone and adapted to generate an open license having usage rights associated with a first item, a second activation device defining a second trust zone and adapted to issue a software package that enforces usage rights to control use of the first item, and a user device associated with the second trust zone and adapted to receive the software package from the second activation device, and the open license to use the first item in accordance with the open license.

A fourth aspect of the invention is a method for managing use of items having usage rights associated therewith. The method comprises defining a first trust zone and a second trust zone, each trust zone having an activation device associated therewith and adapted to issue a software package that enforces usage rights to control use of said items, and generating a license associated with the items in the first trust zone, wherein the license includes usage rights specifying a manner of use and a specification of at least one of an open license and a closed license that determines whether the items are usable in at least one of the first trust zone and the second trust zone.

A fifth aspect of the invention is a method for enforcing a license. The method comprises granting usage rights associated with a protected item to control use of the protected item within a trust zone, determining whether the license was issued in the trust zone or outside of the first trust zone, and determining whether the license is an open license or a closed license. If the license is a closed license issued outside of the trust zone, use of the protected item within said trust zone is prohibited and if the license is an open license issued outside of the trust zone, use of said protected item within the trust zone is permitted.

A sixth aspcet of the invention is a license adapted to be associated with a protected item to control use of the protected item. The license comprises usage rights that specify a manner of use for the protected item; and, license classification indicating whether the license is an open license a permitting use of the protected item outside of the trust zone or a closed license prohibiting use of the protected item outside of the trust zone.

BRIEF DESCRIPTION OF THE DRAWING

The invention is described through a preferred embodiments and the attached drawing in which.

DETAILED DESCRIPTION OF THE PREFERRED EMBODIMENT

Figure 1:
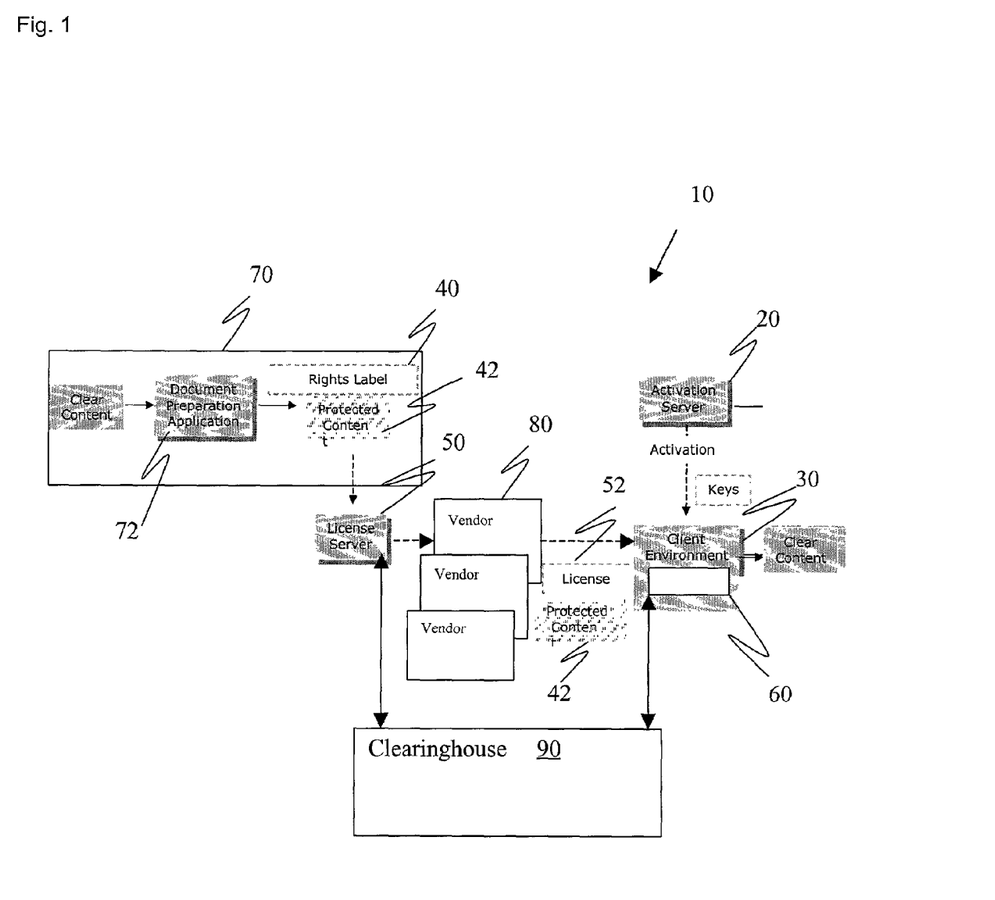
FIG. 1 is a schematic illustration of a DRM System.

A DRM system can be utilized to specify and enforce usage rights for specific content or other item. FIG. 1 illustrates a DRM system 10 that can be used to distribute digital content. DRM System 10 includes a user activation device, in the form of activation server 20, that issues public and private key pairs to content users in a protected fashion, as is well known. Typically, when a user goes through an activation process, some information is exchanged between activation server 20 and client environment 30, and client component 60 is downloaded and installed in client environment 30. Client component 60 serves as a security component and preferably is tamper resistant and contains the set of public and private keys issued by activation server 20 as well as other components such as any necessary engine for parsing or rendering protected content 42.

Rights label 40 is associated with protected content 42 and specifies usage rights that are available to an end-user when corresponding conditions are satisfied. License Server 50 manages the encryption keys and issues licenses 52 for exercise of usage rights in the manner set forth below. Licenses 52 embody the actual granting of usage rights to an end user based on usage rights selected from rights label 40. For example, rights label 40 may include usage rights for viewing protected 42 upon payment of a fee of five dollars and viewing or printing protected content 42 upon payment of a fee of ten dollars. Client component 60 interprets and enforces the usage rights that have been specified in license 52.

Figure 2:
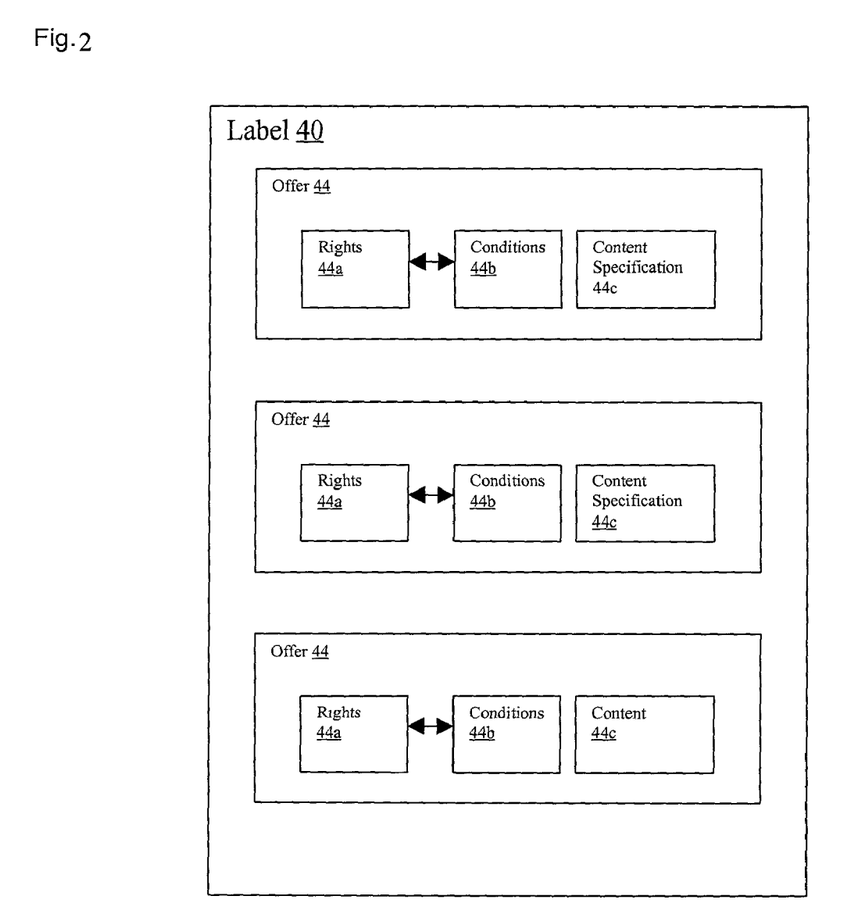
FIG. 2 is a schematic illustration of a rights label.

FIG. 2 illustrates rights label 40 in accordance with the preferred embodiment. Rights label 40 includes plural rights offers 44. Each rights offer 44 includes usage rights 44a, conditions 44b, and content 44c. Content specification 44c can include any mechanism for referencing, calling, locating, or otherwise specifying protected content 42 associated with rights offer 44.

Usage rights specify manners of use. For example, a manner of use can include the ability to use protected content 42, in a specified way, such as printing viewing, distributing, or the like. Rights can also be bundled. Further, usage rights can specify transfer rights, such as distribution rights, or other derived rights. Such usage rights are referred to as "meta-rights". Meta-rights are the rights that one has to manipulate, modify, and/or derive other usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

In many cases, conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Usage rights and conditions can exist as separate entities or can be combined. Rights and conditions can be associated with any item including, objects, classes, categories, and services, for which use, access, distribution, or execution is to be controlled, restricted, recorded, metered, charged, or monitored in some fashion to thereby define a property right.

Protected content 42 can be prepared with document preparation application 72 installed on computer 70 associated with a content distributor, a content service provider, or any other party. Preparation of protected content 42 consists of specifying the rights and conditions under which protected content 42 can be used by associating rights label 40 with protected content 42 and protecting protected content 42 with some crypto algorithm or other mechanism for preventing processing or rendering of protected content 42. A rights language such as XrML™ can be used to specify the rights and conditions in rights label 40. However, the rights and conditions can be specified in any manner. Accordingly, the process of specifying rights refers to any process for associating rights with protected content 42. Rights label 40 associated with protected content 42 and the encryption key used to encrypt protected content 42 can be transmitted to license server 50. Protected content 42 can be a human readable or computer readable content, a text file, a code, a document, an audio file, a video file, a digital multimedia file, or any other content.

A typical workflow for DRM System 10 is described below. A user operating within client environment 30 is activated for receiving protected content 42 by activation server 20. This results in a public-private key pair (and some user/machine specific information) being downloaded to client environment 30 in the form of client software application 60 in a known manner. This activation process can be accomplished at any time prior to the issuing of a license.

When a user wishes to obtain a specific protected content 42, the user makes a request for protected content 42. For example, a user might browse a Web site running on Web server of vendor 80, using a browser installed in client environment 30, and request protected content 42. The user can examine rights offers 44 in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causes both protected content 42 and license 52 to be downloaded. License 52 includes the selected usage rights and can be downloaded from license server 50 or an associated device. Protected content 42 can be downloaded from a computer associated with vendor 80, a distributor, or another party.

Applicant 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM System 10 addresses security aspects of protected content 42. In particular, DRM System 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic, of license 52. Of course, the example above is merely one way to effect a DRM System. For example, license 52 and protected content 42 can be distributed from different entities. Clearinghouse 90 can be used to process payment transactions and verify payment prior to issuing a license.

DRM system 10 shown in FIG. 1 works well in a single activation server implementation, i.e. a system in which one or more devices, such as activation server 20 of FIG. 1, comprise a single activation system.

Activation by a single activation system is desirable because the same activation process can be used to control use of all protected content 42. However, when client component 60 discerns cryptographic signatures, signatures by license devices other then activation server 20 will be rejected. This means that there will be interoperability problems if more than one activation server system is used. However, the multiplicity of parties and complex business models in use today often result in multiple activation server systems and a multiplicity of activation processes. For example, a user may wish to use items such as protected content from different unrelated sources. In such a case, each source would require a unique activation process. Such multiple activations would complicate the user experience because different sets of keys are required to use different content, even when the content is protected with the same DRM system. On the other hand, it is often desirable to restrict use of content only to parties activated by a specific activation system.

In accordance with one preferred embodiment of the present invention, trust zones are associated with an activation device. Open licenses allow the protected items, such as digital content, to be used in any trust zone and closed licenses allow the protected items such as digital content, to be used only within a designated trust zone or plural designated trust zones.

Figure 3:
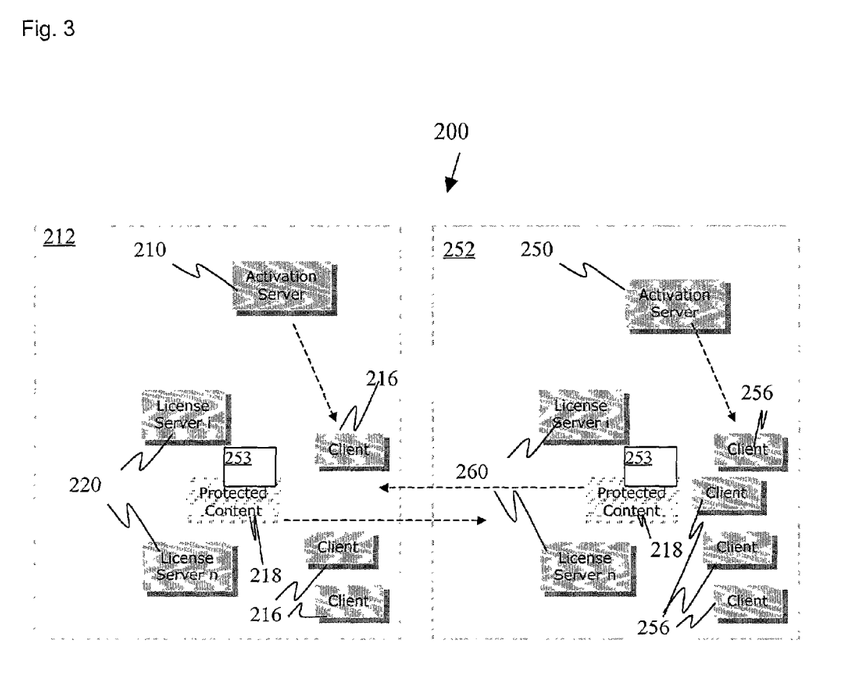
FIG. 3 is a schematic illustration of a DRM system with a plurality of activation servers that each define a trust zone in accordance with one embodiment of the present invention.

FIG. 3 illustrates DRM system 200 of the first preferred embodiment which is described in further detail below. Initially, it should be understood that whereas the term "server" and "client" are used below to describe the devices for implementing the present invention in the embodiments discussed herein, these terms should be broadly understood to mean any appropriate device for executing the function described. For instance, a personal computer, laptop, PDA or other hand held device, or any other general purpose programmable computer, or combination of such devices, such as a network of computers may be used.

DRM system 200 includes first and second activation devices such as two activation servers 210 and 250 that define trust zones 212 and 252, respectively. It is understood that system 200 can have more than two activation servers and corresponding trust zones. Activation server 210 issues public and private key pairs, or another identification mechanism, to user devices such as clients 216 within the trust zone 212. The key pairs allow clients 216 to use protected content in the manner further described below. In addition, in the present example, license device(s) such as license servers 220 are associated with trust zone 212 and are operative to generate licenses 253 in a known manner. Similarly, activation server 250 provides private and public key pairs to clients 256 to allow use of protected content based on the provisions of a license. License servers 260 are associated with trust zone 252 are operative to generate licenses 253.

Activation servers 210 and 250 provide unique private and public key pairs as well as other elements in a software package which is downloaded during an activation procedure by the respective clients in trust zones 212 and 252, respectively. The software package may possess information such as identification or user information, and may be adapted to perform certain functions, for example, rendering and cryptographic functions. The software packages provided to respective clients are used by the clients as a security component to enforce licenses and thus control use of protected content.

In the preferred embodiment, two different types of licenses 253 are issued by the license servers 220 and 260: an "open license" and a "closed license". Licenses 253 contain the rights and conditions that have been granted to a usage device, such as a client, and are digitally signed by the issuer, namely the license servers 220 and 260, in the present example. License 253 is deemed authentic if the signature of the issuing license server can be trusted and verified. License 253 may be an XML or XrML™ file that grants rights and specifies conditions for the use of the protected content.

Figure 5:
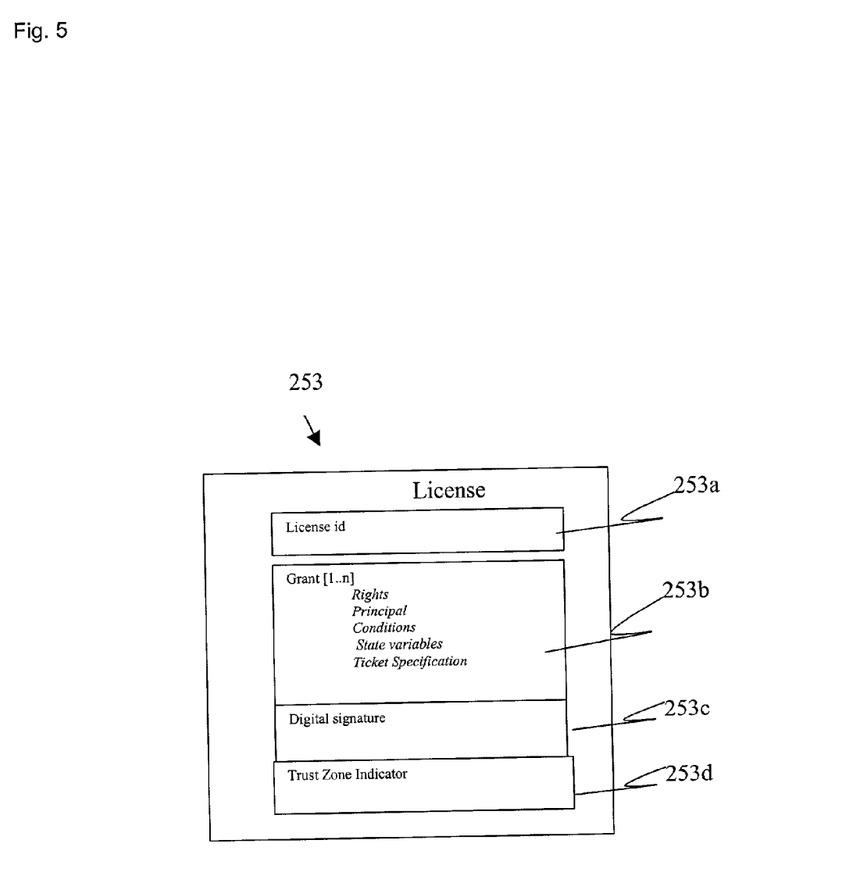
FIG. 5 is a schematic illustration of a license in accordance with the preferred embodiment.

FIG. 5 illustrates a license 25e, in accordance with the preferred embodiment. The structure of license 253, whether it be an open license or a closed license as discussed below, consists of unique ID 255a and one or more digital signatures 253c. Grant 253b includes usage-rights, a principal, conditions, state variably an a content specification designating the associated protect content.

The integrity of license 253 is ensured by the use of digital signature 253c, or another identification mechanism. Digital signature 253c can include the signature code itself, the method of how the signature is computed, the key information needed to verify the signature and also issuer identification information.

An open license is a license 253 that allows protected content to be used by a client using the software package received from any activation server. In other words, content having an open license associated therewith can be used in any trust zone, in accordance with grant 253b. Thus, referring to FIG. 3, protected content 218 in trust zone 212 may be used by a usage device such as client 216 in the same trust zone 212 has been issued. In addition, protected content 218 in trust zone 212 may also be used by client 256 in trust zone 252 as long as an open license associated with protected content 218 is issued to client 256. Likewise, protected content 258 in trust zone 252 may be used by client 256 in the same trust zone 252 as long as client 256 has an open or closed license to the content. In addition, protected content 258 in trust zone 252 may also be used by client 216 in trust zone 212 as long as an open license associated with protected content 258 is issued to client 216. Thus, protected content in one trust zone may be used in accordance with the preferred embodiment by a client in a different trust zone (as well as a client of the same trust zone) if an open license is issued to the user, thereby avoiding interoperability problems of having more than one activation process.

In contrast, a closed license is a license 253 that restricts use of protected content to users which have been activated by an activation server in the same trust zone as the issuing license server and/or other designated trust zones. In other words, protected content associated with a closed license can only be used inside designated trust zones. Thus, in such an instance, referring again to FIG. 3, protected content 218 in trust zone 212 may only be used by client 216 of the same trust zone 212 as long as client 216 is issued a license to do so. In contrast to an open license discussed above, the protected content 218 in trust zone 212 is not consumable by client 256 in trust zone 252 unless trust zone 252 is specifically designated in license 253. Likewise, protected content 258 in trust zone 252 may only be used by client 256 in the same trust zone 252 as long as client 256 is issued a license to do so. As illustrated in FIG. 5, license 253 also includes trust zone indicator 253d. Trust zone indicator 253d can indicate whether license 253 is open or closed. In the case of trust zone indicator 253d indicating a closed license. Trust Zone indicator 253d can indicate one or more predetermined trust zones in which license 253 is valid. Therefore, closed licenses can be used in one or more trust zones while open licenses can be used in all trust zones.

As noted above, different business and security models often require multiple activation servers thereby necessitating a multiplicity of activations. However, having numerous activation procedures and resulting software packages creates confusion and problems for the end users and applications utilized by the client to use protected content. For example, if an activated client loses data in an associated software package(s), the client must then go back and reactivate with each of the corresponding activation systems. As can be appreciated, remembering or tracking which activation server(s) were used in activation of a given software package will likely become a significant problem if more than one activation server is present. Thus, DRM system 200 resolves this problem by establishing trust zones, each with an activation server system, and further utilizes two different types of licenses to effectively manage and utilize multiple activation server systems.

In one implementation of the preferred embodiment, two different types of software packages are provided to clients 216 and 256 by activation servers 210 and 250 during activation. A first type of software package, hereinafter referred to as a "commercial" package, typically allows use of only open licenses. A second type of software package, hereinafter referred to as an "enterprise" package, typically allows use of both open and closed licenses. Commercial software packages and enterprise software packages may merely be considered to be different classes of software packages or separate modules of the same software package that can be selectively activated or enabled in an enterprise application situation so different security policies may exist and one activation system may be used. The commercial software package allows enterprise users the capability to use protected commercial content within the enterprise. The class distinction between a commercial software package and an enterprise software package may be attained using a unique number identifier such as GUID, an XML tag, a flag or another indication.

The process of using content in accordance with a license is described in further detail below. In the single activation environment such as DRM system 10 shown in FIG. 1, client environment 60 would "honor" a license if it can determine that the license is valid, and can trust the signature. In accordance with the preferred embodiment, the process of validating and trusting the signature of a license is enhanced with the capability to discern open licenses and closed licenses, based on trust indicator 253*d*, to allow operation in the manner described above relative to the DRM system 200 of FIG. 3.

Client device 216 or 256 utilizes the software package obtained during the activation process via activation 210 or 250 server to 1) successfully validate that, through digital signature 253*c* and trust zone indicator 253*d*, license 253 is an authentic open license that has been issued in any trust zone or an authentic closed license that has been issued within its own trust zone; or 2) fail the validation e.g., if the license is not authentic or is a closed license that has been issued outside of its own trust zone.

The process of granting license 253, whether it be an open or closed license, also includes signing of license 253 with the keys of the software package obtained during the activation process. In the preferred embodiment of the present invention, well known crypto algorithms and public key infrastructure methods may be used to validate digital signatures. Alternatively, any secure mechanism for identification and/or validation can be used. The preferred embodiment leverages the fact that within the same trust zone, the software package for the license server 220 or 260 and the software package for corresponding client 216 or 256 are issued by the same activation server 210 or 250. Therefore, digital signature 253*c* of license 253 can be verified by recognizing that the certification authority is the same as the one that certified the software package or client 216 or 256. Likewise, if an open license is issued in one trust zone and used in another trust zone, client 216 or 256 recognizes the fact that the certification authority is not the same. Logic in the software package of client 216 or 256 can implement such a decision process, and either accept or reject license 253 depending on which trust zone it was issued from and which trust zones are designated in trust zone indicator 253*d*. License 253 that is not authentic, i.e. a license which has been tampered with or signed with a signature not issued within the hierarchy of activation servers, is always rejected. License authentication generally is well known. As previously noted, the above operation of an open license and closed license is implemented by the use of digital signature 253*c* and trust zone indicator 253*d* as an element of the structure of the license.

In accordance with the preferred embodiment of the present invention, the process of issuing licenses is enhanced by issuing the open licenses and closed licenses described previously. A policy may be implemented and followed to specify whether the license server would issue an open license for the protected content that allows the content to be used in any trust zone, or issue a closed license for the protected content that is specified to be used within a predetermined trust zone or zones. For example, an administrator of an organization may implement a policy in which use of certain content having a predetermined security level or higher is restricted to only within the organization, while other content having a lower security level may be used outside of the organization. Correspondingly, the administrator may implement a policy in which closed licenses are issued for content having higher security levels while open licenses are issued for content having lower security levels. It should also be understood that in accordance with the preferred embodiment, the protected content is neither open nor closed but is merely encrypted and inaccessible without a proper license.

Moreover, the method used for determining the type of license issued regarding a particular protected content could be any appropriate means or process using any specified rules or logic. For example, a system may decide that all the protected content within a corporation can only be used internally so that all licenses issued are closed licenses. A system may also decide that the protected content can be used externally and thus, an open license may be issued.

Figure 6:
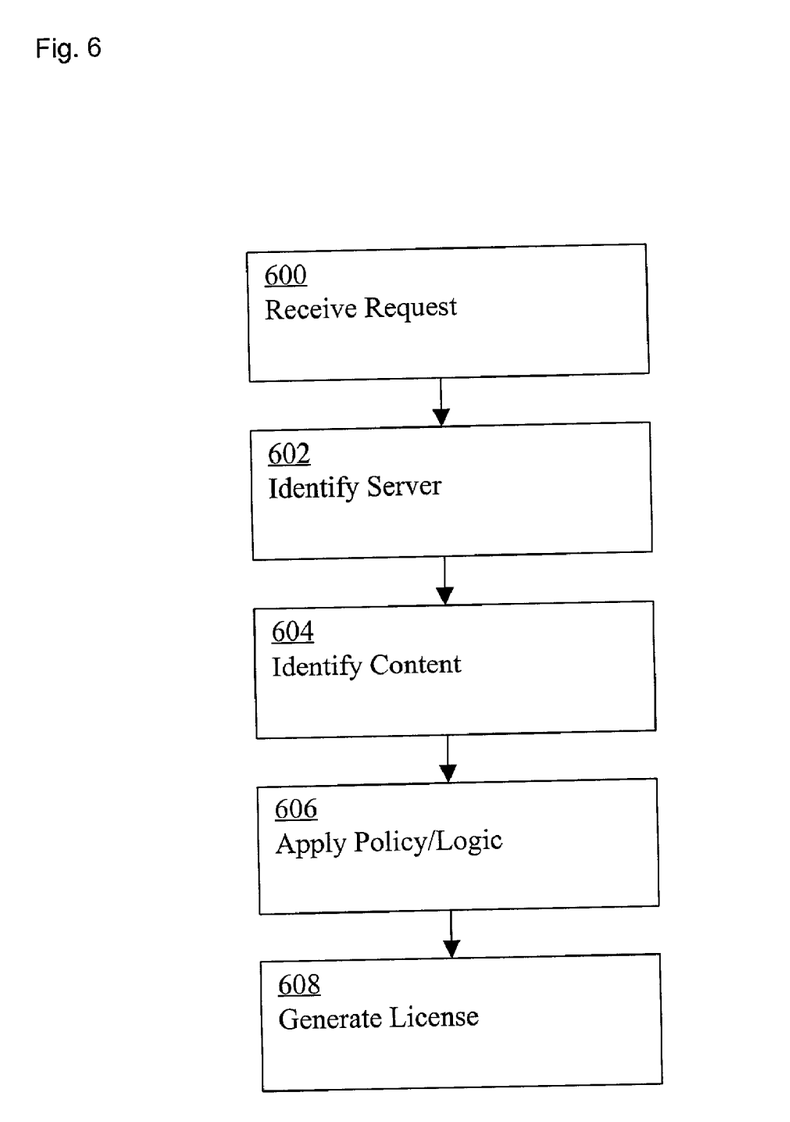
FIG. 6 illustrates a method of generating licenses in accordance with the preferred embodiment.

FIG. 6 illustrates a method of granting licenses in accordance with the preferred embodiment. In step 600, a request for license, to specific content is received by license server 220 or 260. In step 602, the identity and/or location of the source, such as clients 216 or 256, of the request is determined by license server 220 or 260.

In step 604, the identity of the type and/or location of the requested content is determined. Logic is executed in step 606 to determine the type of license 253 to be generated based on the results of the steps 602 and 604 as well as the identity of the license server receiving the request to thereby effect a license policy For example, rules can be applied to the results. Possibly, all licenses requested by specific users are closed. Licenses to users having a specified security clearance can be open or licenses for certain content can be open. Any set of rules or other logic can be applied in step 606. In step 608, license 253 is generated, either as an open or closed license based on the results of step 606.

For example, the logic of step 606 can specify that commercial license server would issue open licenses while an enterprise license server would issue closed licenses. Additionally, a commercial license server would typically not issue closed licenses, and an enterprise license server would typically issue open licenses only to authorized users outside of the enterprise's trust zone. An enterprise would typically issue closed licenses for protected content designated for internal use, and open licenses for protected content designated to be shared outside of the trust zone. Of course, the above logic is an example only, and it should be understood that enterprise any logic can be used to determine whether a license should be open or closed.

In accordance with another implementation of the preferred embodiment a typical client 216 or 256, such as a client device within an enterprise, is activated twice. In particular, client 216 is activated once by activation server 210 within the enterprise (e.g. an enterprise activation device), and a second time by an activation server 250 as a commercial activation device outside of the enterprise. Client 216 can optionally be activated by other activation servers outside of the enterprise. Activation with other activation servers would allow client 216 to use closed licenses from trust zones other than trust zone 212 as well. By establishing trust zones and utilizing open and closed licenses, together with multiple activations, access and use of protected content can be tailored to various applications and based on various conditions and logic.

In one implementation of the preferred embodiment, enterprise users will only be activated by the enterprise activation server so that they cannot obtain an enterprise software package from an activation server outside of its trust zone. This again, allows the enterprise system administrator to set the policy, i.e. logic, for activation. For example, the system administrator can then determine who gets activated and how many times they can be activated. The enterprise can also set an expiration date in the software package, and even revoke the software package, i.e., deactivate the user, if desired. However, the same enterprise user could be able to obtain a commercial software package from any commercial activation server to use protected content with open licenses.

In addition, although any user can obtain a commercial software package from any commercial activation server, the user can be directed to the particular activation server preferred by the protected content provider. Moreover, a default commerce activation server may be provided which activates clients when no particular activation server is requested so that the activated client is able to use any open license.

Figure 4:
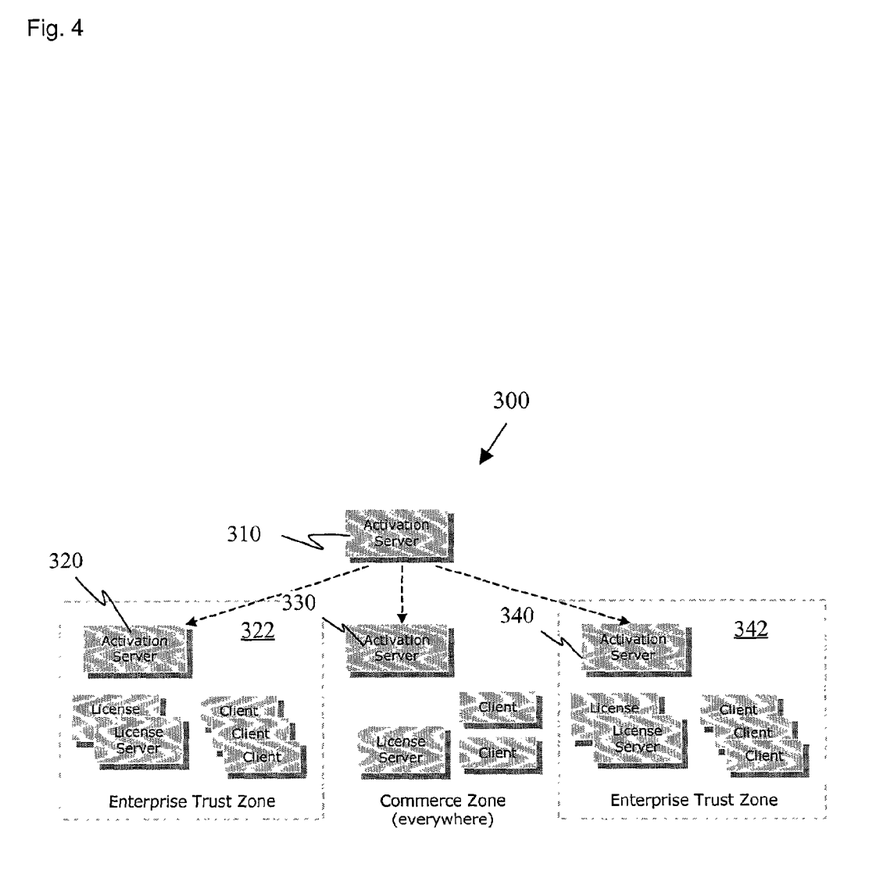
FIG. 4 is a schematic illustration of another DRM system having a top-most activation server in accordance with another embodiment of the present invention.

FIG. 4 is a schematic illustration of DRM system 300 in accordance with another embodiment having an optional topmost activation server 310. As shown, top-most activation server 310 is coupled to a plurality of activation servers 320, 330 and 340. Activation servers 320 and 340 define separate trust zones 322 and 342 respectively. Each trust zone 322 and 342 includes a license server and clients of a specific enterprise in the manner previously described. Activation server 330 is in an open commerce zone, e.g. is a commerce server.

The illustrated embodiment of the present invention provides a hierarchy of trust where top-most activation server 310 serves as an intermediary trusted server that is trusted by activation servers 320, 330, and 340. The provision of topmost activation server 310 allows, for instance, clients in trust zone 322 to use various protected content with an open license in trust zone 342 through activation server 320, without the need for activation server 320 to directly transact with activation server 340 of trust zone 342. For instance, activation servers 320, 330 and 340 may correspond to on-line storefronts, while top-most activation server 310 may be a trusted third entity to which the activation servers 320, 330 and 340 allow access to a particular protected content. Thus, clients in trust zone 322 may use protected content with open licenses in trust zone 342 via activation server 310, although activation server 320 and activation server 340 have not transacted or exchanged information with one another. This hierarchy concept allows protected content with an associated open license in one trust zone to be used by a much larger base of clients since the clients may be in another trust zone, and the activation servers of the trust zones need not directly transact or provide information to one another regarding a key pair and license.

It should again be understood that whereas terms "server" and "client" are used to describe the devices for implementing the present invention in the illustrated embodiments above, these terms should be broadly understood to mean any appropriate device for executing the described function, such as a personal computer, hand held computers, PDAs, or any other general purpose programmable computer or combination of such devices, such as a network of computers. Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various devices and components are segregated by function for the purpose of clarity. However, the various elements can be combined into one device or segregated in a different manner. For example, the software package can be a single executable file and data files, or plural files or modules stored on the same device or on different devices. The software package can include any mechanism for enforcing security and need not include a rendering application or the like. Any protocols, data types, or data structures can be used in accordance with the invention. Moreover, any appropriate means of expressing usage rights and conditions may be used in implementing the present invention. For instance, as previously noted, a rights language grammar such as XrML™ can be used. The varios disclosed components, modules and elements have separate utility and exit as distinct entities.

While various embodiments in accordance with the present invention have been shown and described, it is understood that the invention, as defined by the appended claims and legal equivalents, is not limited thereto. The present invention may be changed, modified and further applied by those skilled in the art. Therefore, this invention is not limited to the detail shown and described previously, but also includes all such changes and modifications.

We claim:

1. A rights management system for managing use of items having usage rights associated therewith, said system comprising:
   a first activation device defining a first trust zone and being adapted to issue a first software package that enforces first usage rights within the first trust zone,
   wherein the first trust zone includes one or more user devices associated therewith and which are activated by the first software package for receiving items within the first trust zone;
   a second activation device defining a second trust zone and being adapted to issue a second software package that enforces second usage rights within the second trust zone,
   wherein the second trust zone includes one or more user devices associated therewith and which are activated by the second software package for receiving items within the second trust zone;
   at least one first license device associated with said first trust zone, said first license device being adapted to generate a license associated with said items and including the first usage rights specifying a manner of use of the items, said license specifying one or more trust zones in which said license is valid; and
   at least one user device associated with said first trust zone, said user device being adapted to receive said first software package, receive said license associated with said items, and to use said items in accordance with said license,
   wherein said items are digital content, and
   said license is one of:
   an open license that specifies that said digital content is used in accordance with the usage rights by user devices having said first software package or said second software package, and
   a closed license that permits said digital content to be used in accordance with the usage rights only by user devices having said first software package.

2. The rights management system of claim 1, wherein at least one of said first software package and said second software package includes a public and private key pair.

3. The rights management system of claim 2, wherein at least one of said first software package and said second software package includes a content rendering application.

4. The rights management system of claim 3, wherein said at least one license device is a plurality of license devices that are each associated with one of said first trust zone and said second trust zone, each of said plurality of license devices being adapted to generate a license associated with said items.

5. The rights management system of claim 4, wherein said at least one user device is a plurality of user devices associated with one of said first trust zone and said second trust zone, each of said plurality of user devices being adapted to receive one of said first or second software packages, receive said license associated with said at least one items, and to use said items in accordance with said license.

6. The rights management system of claim 1, wherein said license is an open license that allows said items to be used in by user devices having the first software package or the second software package.

7. The rights management system of claim 1, wherein said license associated with said items is a closed license that allows said items to be used only by user devices having the second software package.

8. The rights management system of claim 7, wherein said license associated with said items is a closed license that allows said items to be used only by user devices having the first software package and by user devices having a software package from specified trust zones.

9. The rights management system of claim 1 further comprising a second license device associated with said second trust zone and wherein at least one of said first software package and said second software package is a commerce software package that allows said at least one device to use said items having an open license that was issued by either of said first license device or said second license device.

10. The rights management system of claim 1, wherein at least one of said first software package and said second software package is an enterprise software package that allows said at least one user device to use said items having a closed license only in said first trust zone.

11. The rights management system of claim 1, wherein at least one of said first software package and said second software package is an enterprise software package that allows said at least one user device to use said items having a closed license only if said license was generated in said first trust zone.

12. The rights management system of claim 1, further comprising a top-most activation device that provides a top level software package to said first and second activation devices.

13. The rights management system of claim 1, further comprising:
    a plurality of activation devices, each activation device defining a trust zone and being adapted to issue a software package that enforces usage rights to control use of said items; and
    a plurality of usage devices each of usage devices being associated with one of said trust zones and being adapted to receive said software package,
    wherein said license includes a designation as one of an open and closed license.

14. The rights management system of claim 13, wherein said predetermined trust zone comprises a plurality of predetermined trust zones.

15. The rights management system of claim 13, wherein said predetermined trust zone is a trust zone of the license device that generated the license.

16. The rights management system of claim 13, further comprising a top-most activation device that provides a software package for enforcing usage rights to said plurality of activation devices that in turn, issue said software package to said user device.

17. The rights management system of claim 13, wherein said software packages include a public and private key pair.

18. The rights management system of claim 1, wherein said first license device is adapted to generate an open license having usage rights associated with a first item and said system further comprises:

a second activation device defining a second trust zone, said second activation device being adapted to issue a software package that enforces usage rights to control use of said first item; and
    a user device associated with said second trust zone, said user device being adapted to receive said software package from said second activation device, to receive said open license associated with said first item, and to use said first item in accordance with said open license.

19. The rights management system of claim 18, wherein said software package includes a public and private key pair.

20. The rights management system of claim 18, further comprising a second license device associated with said second trust zone, said second license device being adapted to generate a closed license having usage rights associated with a second item, wherein said closed license permits said second item to be used only by said user device.

21. The rights management system of claim 20, wherein said first activation device is further adapted to issue a software package that allows use of said second item in accordance with said closed license.

22. The rights management system of claim 21, further comprising a top-most activation device coupled to said first and second activation devices to provide a software package to said first and second activation devices.

23. A method for managing use of items having usage rights associated therewith, said method comprising the steps of:
    defining a first trust zone and a second trust zone, each trust zone having an activation device associated therewith and adapted to issue a first and second software package, respectively, that enforces usage rights to control use of said items within the first and second trust zones, respectively,
    wherein the first and second trust zones include one or more user devices associated therewith and which are activated by the first and second software packages for receiving items within the first and second trust zones, respectively; and
    generating a license associated with said items in said first trust zone,
    wherein said license includes usage rights specifying a manner of use and a specification of at least one of an open license and a closed license that determines whether said items are usable in at least one of said first trust zone and said second trust zone,
    said open license specifies that said digital content is used in accordance with the usage rights by user devices having said first software package or said second software package, and
    said closed license permits said digital content to be used in accordance with the usage rights only by user devices having said first software package.

24. The method of claim 23, wherein at least one of said first software package and said second software package includes a public and private key pair.

25. The method of claim 23, wherein said license is a closed license that restricts use of said items to said first trust zone.

26. The method of claim 23, wherein said license is an open license that restricts use of said items to either of said first trust zone or said second trust zone.

27. The method of claim 23, wherein said items are digital content.

28. A method for enforcing a license granting usage rights associated with a protected item to control use of the protected item within a trust zone comprising the steps of:

determining whether said license was issued in said trust zone or outside of said trust zone, wherein said trust zone includes one or more user devices associated therewith and which are activated by a first software package for receiving the protected item within the trust zone;

determining whether said license is an open license or a closed license, wherein said open license specifies that said protected item is used in accordance with the usage rights by user devices having the first software package or a second software package, and said closed license permits said protected item to be used in accordance with the usage rights only by user devices having the first software package;

if said license is a closed license issued outside of said trust zone, prohibiting use of said protected item within said trust zone; and if said license is an open license issued outside of said trust zone, permitting use of said protected item within said trust zone.

29. A license adapted to be associated with a protected item to control use of the protected item, said license comprising:
usage rights that specify a manner of use for said protected item; and
a license classification indicating whether said license is an open license a permitting use of said protected item outside of said trust zone or a closed license prohibiting use of said protected item outside of said trust zone,
wherein said trust zone includes one or more user devices associated therewith and which are activated by a software package for receiving the protected item within the trust zone.

30. The license of claim 29, wherein said license is further adapted to be associated with a protected item to control use of the protected item within plural trust zones defined by separate activation devices, and said license further comprising:
a trust zone designation indicating one or more trust zones, wherein said license is one of:
an open license that allows said protected item to be used in any of said trust zones, and
a closed license that allows said protected item to be used only in a predetermined of said trust zones.

31. The method of claim 23, wherein said license includes usage rights specifying a manner of use for said protected item within plural trust zones defined by separate activation devices, said method comprising the steps of:
receiving a request from a user device for a license;
identifying the user device;
identifying the item;
applying logic to the result of said identifying steps to determine if said license should be an open license valid in each of said trust zones or a closed license valid in only predetermined ones of said trust zones; and
generating said license as an open or closed license in accordance with the result of said applying step.

32. The method of claim 31, wherein said applying step comprises generating a closed license if said protected item is determined to be used only internally within an organization.

33. The method of claim 31, wherein said applying step comprises generating an open license if said protected item is determined to be used internally within an organization, and externally outside said organization.

34. The method of claim 31, wherein said applying step comprises generating a closed license if a security level of said identified item exceeds a predetermined level.

35. The method of claim 31, wherein said applying step comprises generating an open license if a security level of said identified item does not exceed a predetermined level.

36. The method of claim 31, wherein said applying step comprises generating a closed license if a security clearance level of said identified user device is below a predetermined level.

37. The method of claim 31, wherein said applying step comprises generating an open license if a security level of said identified user device is above a predetermined level.

38. The method of claim 31, wherein said applying step comprises generating a closed license if said request is received from a predetermined user device.

39. The method of claim 31, wherein said applying step comprises generating an open license if said request is received from a predetermined user device.

* * * * *